United States Patent [19]

Allen

[11] 4,117,950
[45] Oct. 3, 1978

[54] PLASTIC CLOSURE

[75] Inventor: David O. Allen, Wilmington, Ohio

[73] Assignee: Buckeye Molding Company, New Vienna, Ohio

[21] Appl. No.: 843,513

[22] Filed: Oct. 19, 1977

[51] Int. Cl.² .................................................. B65D 41/16
[52] U.S. Cl. ........................................ 220/306; 229/43
[58] Field of Search .................. 220/306, 380; 229/43, 229/1.5 B

[56] References Cited

U.S. PATENT DOCUMENTS

| 3,367,665 | 2/1968 | Gorman | 220/306 |
| 3,531,013 | 9/1970 | Hammes | 220/306 |
| 3,567,016 | 3/1971 | Bardell | 220/306 |
| 3,679,088 | 7/1972 | Swett et al. | 220/306 |
| 3,679,089 | 7/1972 | Swett et al. | 220/355 |
| 3,843,016 | 10/1974 | Bornhorst | 220/306 |

*Primary Examiner*—George T. Hall
*Attorney, Agent, or Firm*—Dybvig & Dybvig

[57] ABSTRACT

A flexible, one-piece molded plastic closure having a circular outer rim and a center panel. The center panel has thin panel portions bounded by radially extending rib portions, the panel portions and the rib portions being integrally joined to the outer rim.

The method of molding the closure and tooling used therefor are also disclosed. During the molding of a closure, molten plastic flows radially along channels formed in the tooling to chamber portions forming the rim. Plastic remaining in the channels cools to form the ribs. The panel parts between the ribs are formed from plastic flowing from the channels.

6 Claims, 5 Drawing Figures

U.S. Patent     Oct. 3, 1978     4,117,950
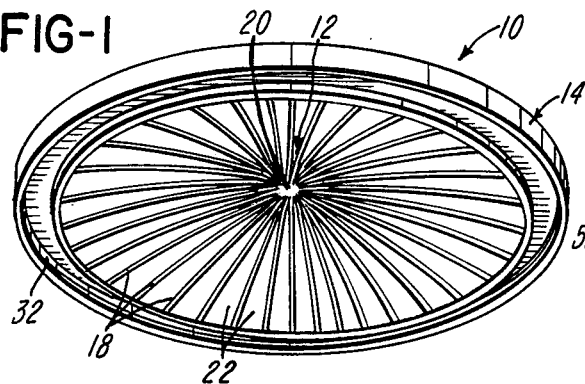
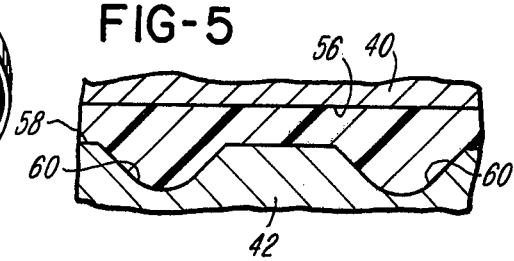
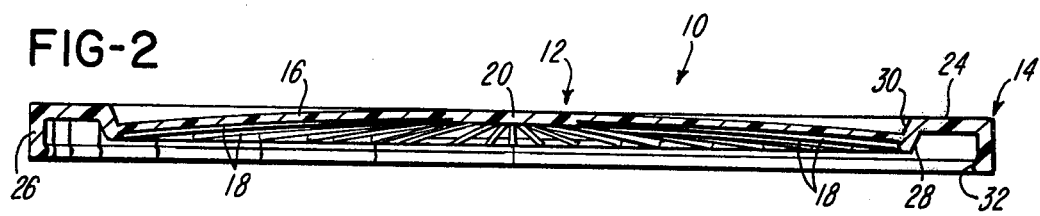
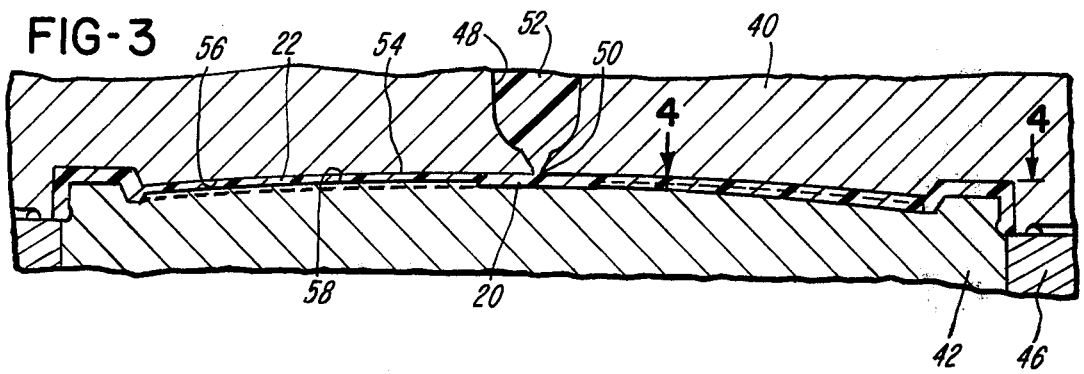
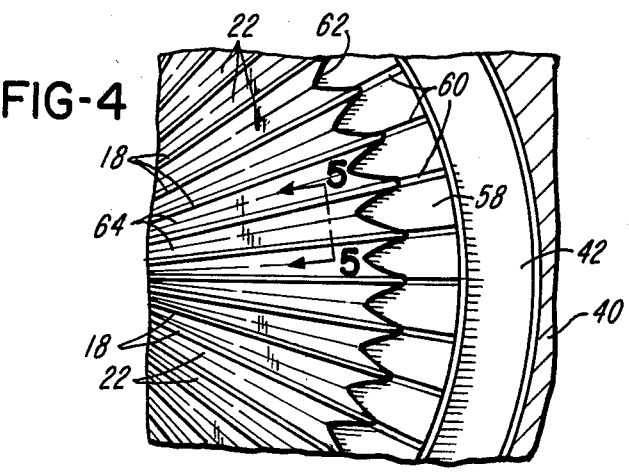

PLASTIC CLOSURE

BACKGROUND OF THE INVENTION

This invention relates to the molding of plastic closures and more particularly to the molding of plastic closures having relatively large center panels. However, the invention is not necessarily so limited.

This invention is especially applicable to relatively large closures such as No. 403 and No. 502 closures and reclosures that are used in the packaging of margarine, as reclosures for coffee cans, and for other purposes. Although the invention is applicable to closures of various sizes, it is primarily intended for use with closures having a wall thickness that is small in relation to the surface area of the closure and the closures made from quite flexible thermoplastic materials such as low density polyethylene.

Conventional closures used in the packaging of margarine or the like have a large center panel of substantially uniform thickness, the outer margins of which join with an outer top panel part and a skirt which is usually molded thicker than, and thus stiffer than, the center panel. Many millions of such closures are produced and used every year.

Although the success of the conventional closures cannot be questioned, it would obviously be desirable to reduce the amount of plastic used in the production of each closure since any savings would be multiplied millions of times over each year.

Furthermore the conventional closures suffer from a drawback in that it is practically impossible to mold the closures without some warping of the closure rims. The degree of warping is variable, but the warpage is often sufficiently great that it can cause difficulty in the handling of molded closures up to the time they are placed on the containers. Occasionally the warpage may be so great as to make the closure appear to be an inferior product.

Conventional closures are typically molded with the use of injection molding machines provided with tooling having a pin hole gate opening to the center of the closure. The mold cavity is so shaped that the plastic in a molten state flowing through the gate flows into the cavity and throughout the cavity in an ever-expanding circle until the cavity is full. Thus at every point the plastic flows radially outwardly from the gate. After the cavity is filled, the plastic is permitted to cure to a solid state, which takes just a few seconds, and the complete part is ejected from the mold. Heretofore it has not been considered practicable to injection mold extremely thin walled closures. The molten plastic is injected under high pressure to fill a mold cavity. Injection pressures increase as wall thicknesses decrease because of the pressure required to cause the plastic to flow radially outwardly from the gate in very thin sections. The problem of filling very thin sections is compounded by the fact that the plastic begins to cure and thus become more viscous at a relatively rapid rate so that, when filling a cavity that forms thin sections following conventional practice, the radially outermost portions of the plastic begin to set up and thus further increase the required injection pressure.

SUMMARY OF THE INVENTION

In accordance with this invention, a flexible, one-piece closure is provided comprising a relatively large central panel bounded by an outer rim. The wall thickness of the central panel is quite small, being on the order of 0.015 inches or less. A plurality of radially extending ribs project from the center of the central panel to the rim, the ribs preferably projecting from the bottom surface of the panel and forming therebetween plural, pie-shaped, thin-walled panel sections.

The closures may be molded using conventional injection molding machines provided with tooling including mold chamber forming parts having a central gate. A surface of the tooling has channels extending radially from the axis of the gate. After the chamber formed by the tooling is filled with plastic, the plastic located in the channels cools to form the aforementioned ribs. As the chamber is filled with plastic, the pie-shaped, thin-walled panel sections between ribbed portions are formed from plastic flowing outwardly from the channeled portions, the plastic flowing from one channeled portion joining with the plastic flowing from the adjacent channeled portions along radial lines located centrally between the channels. The thin-walled panel sections are thus formed from plastic which, during the molding operation, flows generally transversely to channels forming the ribs.

Several benefits are obtained by producing closures in this manner. The center panels can be made substantially thinner than the center panels of conventional closures using practical injection pressures. Also, there is a substantial reduction in warpage of the rims of the closures. The warpage is so small that, for mechanized handling purposes, the closures can be considered to have no warpage at all.

Since the center panels may be made substantially thinner than the center panels of prior closures, there is a direct economy resulting from the lesser amount of plastic required to produce the closures. The time required to mold the closures may be reduced since, partly because of reduced warpage, it may be possible to remove a molded closure from the mold tooling at a higher temperature than in the case of conventional closures. The injection pressures required may be no more than required for the manufacture of conventional, thicker-walled closures.

During molding of a closure in accordance with this invention, the plastic entering the gate spreads first to a small circular center part of the center panel and then flows radially outwardly along the channels until the rim cavity part is filled with plastic. Part of the plastic flowing along the rib forming channels flows generally transversely to the channels. Since the primary flow of plastic is along the channels, the plastic flowing between ribs that forms the thin panel sections fills in the panel sections more slowly than the channels are filled in. However, the ribs are placed close enough together that the thin panel sections between ribs are completely formed before the closure rim is formed so that there are no voids in the plastic. The formation of the thin panel sections is akin to the formation of flash in other plastic molded parts as those familiar with the art will be fully aware.

It is possible to initially form the center panel flat. However, the rim section of the closure being necessarily thicker than the thinner panel parts will accordingly shrink more as the closure cools following molding. Accordingly, when the closure is completely cooled the center panel is too large for the area it occupies and it easily "oil cans". Although such closures would be as functionally satisfactory for the purpose of closing containers as are conventional closures, the wavy appearance of the center panel may be objectionable. In a further aspect of this invention, the mold cavity is shaped to form a non-planar center panel so that, as the closure cools following molding, the greater shrinkage of the closure rim will simply result in an exaggeration of the non-planar shape of the center panel. The non-planar shape could, for example, be obtained by forming the center panel as a dome. It can thus have a pleasing appearance and will be at least mildly resistant to oil canning.

BRIEF DESCRIPTION OF THE DRAWINGS

FIG. 1 is a perspective view looking generally toward the bottom of a closure made in accordance with this invention.

FIG. 2 is a cross sectional view of the closure of FIG. 1 taken along a diameter thereof extending through opposed thin-walled panel sections as indicated by the arrows 2—2 of FIG. 1.

FIG. 3 is a cross sectional view of tooling for an injection molding machine and showing plastic filling the mold cavity. The cross section through the left side of the center panel is taken through a thin-walled panel section and on the right side through a ribbed portion.

FIG. 4 is a cross sectional view of a portion of the tooling taken along section line 4—4 of FIG. 3 but showing the mold cavity only partly filled with plastic.

FIG. 5 is a cross sectional view of the tooling taken along section line 5—5 of FIG. 4.

DESCRIPTION OF THE PREFERRED EMBODIMENT

With reference to FIGS. 1 and 2, a closure manufactured in accordance with this invention is generally designated 10 and comprises a center panel generally designated 12 and a rim generally designated 14. The closure 10 is manufactured in one piece from a suitable thermoplastic material. In the preferred embodiment the plastic material will form a flexible closure, low density polyethylene being the material of choice. However, the closure may be formed to be substantially rigid for which purpose high density polyethylene could be used. Various styrene and other plastic compositions could also be used.

The center panel 12 comprises a disc-like circular thin-walled body member 16 having a thickness on the order of 0.015 inches or less. The top surface of the body member 16 is preferably substantially smooth and unbroken. Its bottom surface is also smooth except for a plurality of superposed, downwardly projecting and radially extending ribs 18 that meld together at the center of the body member 16 to form a central button or disc 20. The ribs 18 are equally spaced from one another, the angle between each pair of adjacent ribs being equal to the angle between each other pair of adjacent ribs, and span the entire distance from the central disc 20 to the outer margin of the center panel 12. Each rib 18 comprises an elongate body that is quite narrow in relation to its length and that has a wire or rod-like configuration. Accordingly, the array of ribs and the center disc form boundaries for the remaining thin-walled panel sections, designated 22, that constitute outwardly divergent pie or wedge shaped sectors of the panel body member 16.

The precise dimensions of the ribs 18 and the angle between adjacent ribs and therefore the number of ribs will depend upon several factors. As will become apparent below, the cross sectional area of the ribs must be sufficient to meet certain requirements during the molding of the closure 10. The minimum number of ribs and the cross sectional dimensions of the ribs will, in general, depend upon the type of plastic from which the closure is molded, the diameter of the center panel, and the thickness of the panel body member 16. As a general rule, as the diameter of the center panel 12 increases, the angle between adjacent ribs must decrease. The same is true as the thickness of the panel body member 16 decreases.

The rim 14 comprises a ring-shaped body having an annular top plate portion 24 that forms the outermost margin of the top of the closure 10, a skirt 26 depending downwardly from the outer edge of the top plate section 24 and a sloping wall 28 that slopes downwardly and inwardly from the inside edge of the top plate portion 24. The inner, upwardly facing surface 30 of the sloping wall 28 is integrally joined to the outer margin of the closure center section 12.

The skirt 26 may have an inwardly directed bead 32 designed to cooperate with a bead on a container (not shown) with which the closure 10 is designed for use so that the closure 10 may be snap fit onto the container. As will be appreciated by those familiar with the art, the details of construction of the rim 14 including the skirt 26 are not important to this invention, this invention being broadly applicable to a variety of closure rim and/or skirt constructions.

The center section 12 may be molded essentially flat. However, because of non-uniform shrinkage, a center section molded flat tends to slightly buckle or become wavy after the plastic solidifies and cools. Although this does not directly affect its function as a closure, its appearance may be objectionable. A more pleasing appearance may be obtained by forming the center section to a non-planar shape as will be further described below.

Injection molding machine tooling useful for molding the closure described above is illustrated in FIGS. 3, 4 and 5. The tooling includes a cavity plate 40, an opposing core 42, and a stripper ring 46. A sprue 48 of an insulated runner system is formed in the cavity plate 40, the sprue 48 tapering at its lower end to form a pin hole center gate 50 for the introduction of molten plastic 52 into the mold cavity 54 formed between opposing surfaces of the cavity plate 40 and the core 42. In FIG. 3 the cavity 54 is shown filled with plastic so that the center disc 20, a panel section 22 and a rib 18 for a closure are illustrated. It will be appreciated that the tooling shown in FIG. 3 is oriented so that the cavity 54 is generally horizontal, whereas in practice the cavity will be vertical so that when the molding is completed and the core 42 and cavity 40 are separated, the molded closure can be removed from the core 42 by operation of the stripper ring 46 and the molded closure will then fall downwardly under the force of gravity.

Since it is intended that the top surface of the center panel 12 be substantially smooth and unbroken, the surface designated 56 of the cavity plate 40 in surrounding relation to the center gate 50 is substantially smooth. The confronting surface 58 of the core 42 is also substantially smooth except that it is provided with a plurality of channels 60, the channels extending radially outwardly from the axis of the sprue 48 and the gate 50. As obvious, the channels 60 are used to form the ribs 18.

In the use of the apparatus shown in FIGS. 3, 4 and 5, the molding cycle begins with the cavity 54 empty of plastic. Molten plastic is forced under pressure into the cavity 54 through the sprue 48 and gate 50. The spacing between confronting portions of the cavity plate 40 and the core 42 is such that the injection pressure will not be sufficient to cause the molten plastic to flow radially from the gate 50 and fill the portions of the cavity 54 which form the thin, pie-shaped panel sections 22. Rather, the molten plastic will flow radially outwardly along the channels 60 toward the portions of the cavity 54 forming the closure rim 14. Part of the plastic flowing along the channels 60 flows outwardly in a direction generally transverse to the channels 60 to fill in the thin cavity portions that form the thin panels 22.

FIG. 4 illustrates the progression of the plastic as the mold chamber is being filled, the advancing edge of the plastic being indicated by a heavy line 62. It will be noted that the plastic advances faster along the channels 60 than it does in the cavity portions between the channels 60. The plastic flows outwardly from the channels 60 to fill in the portions therebetween such that the plastic flowing outwardly from one channel joins or knits with the plastic flowing from adjacent channels to form knit lines indicated at 64 extending substantially along the bisectors between channels. Because of this manner of filling the mold cavity, it is apparent that a very large spacing between the channels 60 could create a condition wherein the plastic flowing from the channels to fill in the portions therebetween would not fill in these portions before the plastic flowing along the channels fills in the cavity portion forming the rim 14. Thus, there is a limit on the maximum spacing between channels which those familiar with molding techniques can readily determine.

The transverse dimensions of the channels 60 and, accordingly, the ribs 18 are sufficient to assure that, when the molten plastic is flowing into the cavity 54, the channeled portions provide conduits capable of carrying the plastic to the outer extremities of the cavity 54. The connection between the channeled portions and the cavity parts that form the rim should be such that the plastic can flow readily from the channels to the rim. Accordingly, the juncture between the closure wall 28 and the ribs 18 is such that there is no constriction which would prevent the flow of plastic as readily into the rim as the flow of plastic along the channels. As the plastic flows from the juncture between the channels 60 and the rim-forming cavity parts, the flow of plastic to form the rim is both radial and circumferential.

The center portion of the cavity plate 40 is shown to be arcuately concave and the confronting surface of the core 42 is arcuately convex so that the center panel 12 formed therebetween is slightly domed. After removal of a molded closure from the mold tooling, the depth of the dome will be increased because the center panel 12 shrinks less than does the rim 14 as the closure cools. Other non-planar configurations could be adopted and, as mentioned above, the center panel could be molded flat although with less desirable results.

As mentioned above, there is practically no warpage of the rims of closures made in accordance with this invention. The reasons for this may not be fully understood but it is believed that the rim shape is quite uniform because the center panel is so thin and its connection to the rim so lacking in rigidity that stresses in the center panel are not transmitted to the rim. In contrast, stresses in the center panels of conventional closures are transmitted directly to the rims. The fact that the rim is formed from plastic that flows both radially and circumferentially may contribute to the apparent resistance of the rim to warpage.

It is to be understood that the specific dimensions of a closure manufactured in accordance with this invention may differ within relatively wide limits. As an example, a size 403 closure may have 36 ribs spaced respectively 10° apart, the ribs projecting 0.014 inches from the bottom surface of the panel body member 16. The body member 16 may have a thickness of 0.013 inches and the entire center panel have a diameter of 3.77 inches. Closures have been successfully produced with the foregoing dimensions from low density polyethylene. In general a maximum combined thickness of the panel body member 16 and the ribs 18 of 0.030 inches or less would be desirable. In a standard 403 closure the center panel commonly has a uniform thickness between 0.026 inches and 0.028 inches so that it is seen that the construction described above provides a substantial reduction in the average thickness of the center panel.

Ribs that extend in other than radial directions can be readily envisioned. For example, the ribs could project tangentially from the outer margin of the center disc 20 or they could branch out or bend into other than radial directions. Radial ribs are presently preferred because they are believed to require the most easily manufactured tooling. They may also be the best for molding since the molten plastic readily flows in uninterruptedly radial directions.

Although the presently preferred embodiment of this invention has been described, it will be understood that within the purview of this invention various changes may be made within the scope of the appended claims.

Having thus described my invention, I claim:

1. In a one piece molded plastic closure of the type having a center panel and a rim, the improvement wherein said center panel comprises a body having ribs projecting from a surface of said body and thin walled panel sections between said ribs, said ribs and said rim being formed from molten plastic flowing in the length direction of said ribs, and said panel sections being formed from plastic flowing from said ribs in directions other than said length directions.

2. The closure of claim 1 wherein said ribs project substantially radially from substantially the center of said center panel.

3. The closure of claim 1 wherein said ribs are integrally joined to said rim, the juncture between said rim and said ribs being formed without constriction that would impede the flow of plastic to said rim.

4. A one piece molded plastic closure comprising a panel having a plurality of ribs extending substantially radially from a predetermined point on said panel molded from plastic flowing in the length direction of said ribs from said point and further comprising thin walled panel sections having a thickness less than the thickness of said ribs formed from plastic flowing from said ribs so that the plastic flowing from one rib joins the plastic flowing from the adjacent rib substantially along the bisector of the angle between adjacent ribs.

5. An injection molded plastic closure comprising a center panel having opposed surfaces, one of said surfaces being substantially smooth throughout substantially its entire area, the other of said surfaces being substantially smooth throughout its entire area except for plural ribs extending from the center area of said panel to the outer margin of said panel, the thickness of said panel between said ribs being less than about 0.015 inches.

6. The closure of claim 5 wherein said ribs extend substantially radially from the center of said panel.

* * * * *